US009165058B2

(12) United States Patent
Kim

(10) Patent No.: US 9,165,058 B2
(45) Date of Patent: Oct. 20, 2015

(54) APPARATUS AND METHOD FOR SEARCHING FOR PERSONALIZED CONTENT BASED ON USER'S COMMENT

(71) Applicant: ELECTRONICS AND TELECOMMUNICATIONS RESEARCH INSTITUTE, Daejeon-si (KR)

(72) Inventor: Hyung-Woo Kim, Gyeonggi-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 36 days.

(21) Appl. No.: 13/678,871

(22) Filed: Nov. 16, 2012

(65) Prior Publication Data
US 2014/0019482 A1 Jan. 16, 2014

(30) Foreign Application Priority Data

Jul. 11, 2012 (KR) .......................... 10-2012-0075688

(51) Int. Cl.
G06F 17/30 (2006.01)
(52) U.S. Cl.
CPC .... *G06F 17/30663* (2013.01); *G06F 17/30864* (2013.01)
(58) Field of Classification Search
USPC ............... 707/706, 736, 742, 748, 750, 70
See application file for complete search history.

(56) References Cited

U.S. PATENT DOCUMENTS

| 6,993,487 | B2 * | 1/2006 | Bluvband | 704/275 |
|---|---|---|---|---|
| 7,130,885 | B2 * | 10/2006 | Chandra et al. | 709/206 |
| 8,219,555 | B1 * | 7/2012 | Mianji | 707/736 |
| 8,412,707 | B1 * | 4/2013 | Mianji | 707/736 |
| 8,452,790 | B1 * | 5/2013 | Mianji | 707/758 |
| 8,521,734 | B2 * | 8/2013 | Walther et al. | 707/732 |
| 8,606,792 | B1 * | 12/2013 | Jackson et al. | 707/748 |
| 9,043,336 | B2 * | 5/2015 | Wolf et al. | 707/748 |
| 2007/0106957 | A1 * | 5/2007 | Nuno et al. | 715/810 |
| 2008/0077658 | A1 * | 3/2008 | Kojima | 709/203 |
| 2008/0270356 | A1 * | 10/2008 | Anderson et al. | 707/3 |
| 2008/0307320 | A1 * | 12/2008 | Payne et al. | 715/751 |
| 2009/0043814 | A1 * | 2/2009 | Faris et al. | 707/104.1 |
| 2009/0100357 | A1 * | 4/2009 | Signorini et al. | 715/760 |
| 2009/0271524 | A1 * | 10/2009 | Davi et al. | 709/231 |
| 2010/0146009 | A1 * | 6/2010 | Kandekar et al. | 707/803 |
| 2010/0262597 | A1 | 10/2010 | Han | |
| 2010/0306123 | A1 * | 12/2010 | Cai et al. | 705/347 |

(Continued)

FOREIGN PATENT DOCUMENTS

KR 10-0917784 B1 9/2009

OTHER PUBLICATIONS

Carmel et al. "Personalized social search based on the user's social network", pp. 1227-1236, ACM New York, NY, USA © 2009, ISBN: 978-1-60558-512-3.*

(Continued)

*Primary Examiner* — Hanh Thai
(74) *Attorney, Agent, or Firm* — Ladas & Parry LLP

(57) ABSTRACT

An apparatus and a method for searching for personalized content based on a user's comment are provided and designed to search for and provide the personalized content based on a user's preference using a user comment-based search technique, thereby raising user's satisfaction with search results and enhancing search accuracy.

17 Claims, 2 Drawing Sheets

(56) References Cited

U.S. PATENT DOCUMENTS

| | | | |
|---|---|---|---|
| 2011/0078041 A1* | 3/2011 | Barker | 705/26.25 |
| 2011/0106829 A1* | 5/2011 | Pradhan et al. | 707/765 |
| 2011/0185025 A1* | 7/2011 | Cherukuri et al. | 709/206 |
| 2011/0246463 A1* | 10/2011 | Carson et al. | 707/737 |
| 2012/0023398 A1* | 1/2012 | Hoshino et al. | 715/256 |
| 2012/0023447 A1* | 1/2012 | Hoshino et al. | 715/823 |
| 2012/0079073 A1* | 3/2012 | Kojima | 709/217 |
| 2012/0110002 A1* | 5/2012 | Giambalvo et al. | 707/769 |
| 2012/0150997 A1* | 6/2012 | McClements, IV | 709/217 |
| 2012/0173508 A1* | 7/2012 | Zhou | 707/709 |
| 2012/0215773 A1* | 8/2012 | Si et al. | 707/723 |
| 2012/0233161 A1* | 9/2012 | Xu et al. | 707/732 |
| 2012/0316962 A1* | 12/2012 | Rathod | 705/14.54 |
| 2013/0054714 A1* | 2/2013 | Bedi | 709/206 |
| 2013/0066981 A1* | 3/2013 | Park et al. | 709/206 |
| 2013/0091144 A1* | 4/2013 | Peters et al. | 707/748 |
| 2013/0183652 A1* | 7/2013 | Jain | 434/352 |
| 2014/0351228 A1* | 11/2014 | Yamamoto | 707/692 |

OTHER PUBLICATIONS

Wai Gen Yee, et al; "Are Web User Comments Useful for Search"?, LSDS-IR Workshop, Jul. 2009, Boston, USA; 8 pages.

* cited by examiner

APPARATUS AND METHOD FOR SEARCHING FOR PERSONALIZED CONTENT BASED ON USER'S COMMENT

CROSS-REFERENCE TO RELATED APPLICATION

This application claims the benefit under 35 U.S.C. §119 (a) of Korean Patent Application No. 10-2012-0075688, filed on Jul. 11, 2012, the entire disclosures of which is incorporated herein by references for all purposes.

BACKGROUND

1. Field

The present invention is related to a technology for searching for content, and more specifically, to an apparatus and a method for searching for personalized content based on a user's comment.

2. Description of the Related Art

Without a definite content title or name, it is hard to search for content. For example, in the case of searching for a specific movie, it is difficult to search for the movie without knowing a movie title, a director or a film studio.

However, if a movie is searched based on viewers' reaction, that is, their comments, it may be much easier to find the movie even though a definite content title or name is not given.

The inventor of the present invention has researched a technology for searching for personalized content based on a user's preference using the user comment-based search technique in order to raise a user's satisfaction with search results and enhance search accuracy.

SUMMARY

The following description relates to deal with the above-mentioned problem, and aims to provide an apparatus and a method for searching for personalized content based on a user's preference using the user comment-based technique.

In one general aspect of the present invention, there is provided an apparatus for searching personalized content based on a user's comment, and the apparatus includes a preference analyzing unit configured to analyze a user's comment related to a user query and extract the user's preferred terms; a query extending unit configured to select at least one term from the extracted terms and generate a query set which includes the user query and the selected term; and a content searching unit configured to search for pieces of content based on the query set.

The preference analyzing unit may extract the user's preferred terms related to the user query from information about the user's comment using a Term Frequency-Inverse Document Frequency (TF-IDF) technique.

The query extending unit may select at least one term from the terms extracted by the preference analyzing unit based on a weight value assigned on each term.

The apparatus may further include a comment information database (DB) configured to store the information about the user's comment on each piece of content.

The content searching unit may search for pieces of content corresponding to a query set from a content index database (DB) which stores indexed terms related to each piece of content.

The apparatus may further include a content indexer configured to analyze the user's comment on each piece of content, index the terms related to each piece of content and store the indexed terms.

The apparatus may further include a search result providing unit configured to provide information about the pieces of content found by the content searching unit to a user terminal through which the user query is received.

The search result providing unit may determine priorities of the found pieces of content and provide the information about the found pieces of content according to the determined priorities.

The apparatus may further include a query receiving unit configured to receive the user query.

The query receiving unit may provide a user interface and receive the user query from the user terminal through the user interface.

In another general aspect of the present invention, a method for searching personalized content based on a user's comment is provided, and the method includes receiving a user query from a user terminal; analyzing a user's comment on the received user query and extracting the user's preferred terms; selecting at least one term from the extracted terms and extending the user query and generate a query set which includes the user query and the selected term; searching for pieces of content based on a query set; and providing information about the found pieces of content to the user.

The extracting of the user's preferred terms may include extracting the user's preferred terms related to the user query from the information about the user's comment using a TF-IDF technique.

The selecting of the at least one term may include selecting at least one term from the extracted terms based on a weight value assigned on each term.

The searching for pieces of content may include searching for the pieces of content corresponding to the query set from a content index database (DB) which stores indexed terms related to each piece of content.

The providing of the search results may include determining priorities of the found pieces of content and providing information about the found pieces of content according to the determined priorities.

The present invention allows personalized content to be searched using a user-comment based searching technique, thereby raising a user's satisfaction with search results and enhancing search accuracy.

BRIEF DESCRIPTION OF THE DRAWINGS

The above and other features, aspects and advantages of the present invention will be more apparent from the following detailed description taken in conjunction with the accompanying drawings, in which.

Figure 1:
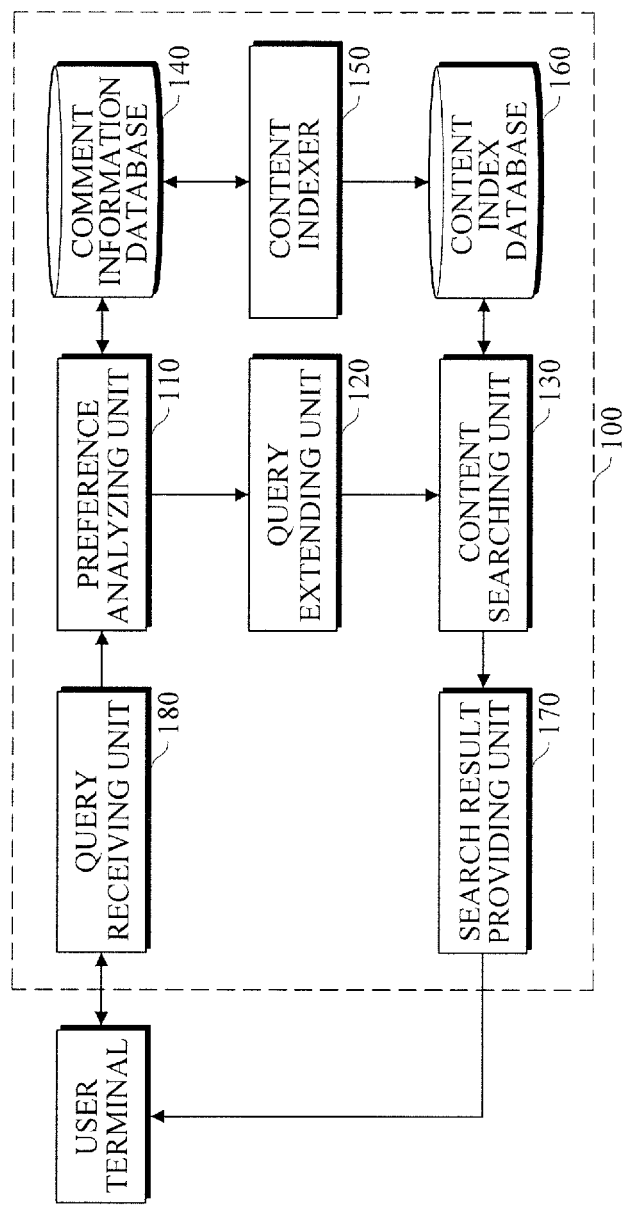
FIG. 1 is a block diagram illustrating an apparatus for searching for personalized content based on a user's comment according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is delivered to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram illustrating an apparatus for searching for personalized content based on a user's comment. As shown in FIG. 1, the apparatus for searching for personalized content based on a user's comment 100 includes a preference analyzing unit 110, a query extending unit 120 and a content searching unit 130.

The preference analyzing unit 110 analyzes a user's comment related to a user query and extracts the user's preferred terms. The user's comment is the user's assessment of each piece of content and includes an informal comment.

For example, the preference analyzing unit 110 may extract the user's preferred terms related to the user query from information about the user's comment using a Term Frequency-Inverse Document Frequency (TF-IDF) technique.

At this time, when the preference analyzing unit 110 extracts the user's preferred terms related to the user query from the information about the user's comment, it may utilize not only the frequency of the terms included in the user's comment but also other information including the user's scores on a corresponding piece of content.

TF-IDF, used as a weight value in the case of information retrieval and text mining, refers to a numerical statistic which reflects how important a specific term is to a group of documents. For example, TF-IDF is used to extract a key word from a document, determine priorities of search results in a search engine or to calculate a similarity rate of documents.

Term Frequency (TF) refers to a value which reflects how frequently a specific term appears in a document. The higher a TF value is, the more important a corresponding term is in a document. On the other hand, Document Frequency (DF) is a value which reflects how frequently a specific term appears in a whole group of documents. A high DF value means that a corresponding term is commonly used. Inverse Document Frequency (IDF) is the inverse number of DF, and TF-IDF is a value of TF multiplied by IDF.

An IDF value is determined according to an attribute of a group of documents. For example, the term "atom" is hardly used in general documents, so that the term "atom" may have a high IDF value and become a keyword of a corresponding document. However, as "atom" is commonly used in atom-related documents, weight values may be given to other terms, which are able to divide the documents into small parts.

For example, if a user query used for a movie content search is 'touching', the preference analyzing unit 100 analyzes the user's previous comments on the movie content and extracts high-frequency terms related to 'touching'.

The query extending unit 120 selects at least one term from the terms extracted by the preference analyzing unit 110 and generates a query set which includes the user query and the selected term. Specifically, the query extending unit 120 may select at least one term from the terms extracted by the preference analyzing unit 110 based on a weight value assigned on each term.

For example, in the case where, in the descending order of weight values, 'performance', 'interest' and 'story' are extracted as the terms related to the user query of 'touching' using a TF-IDF technique, the query extending unit 120 may select 'performance' which has the biggest weight value among 'performance', 'interest' and 'story'.

The content searching unit 130 searches for pieces of content based on a query set generated by the query extending unit 120. For example, if a user query 'touching' is received with respect to a piece of movie content and 'performance is selected as a query to be generated, a query set may be {touching, performance}.

It is considered that the user is likely to be touched by performances of actors/actresses starring in a piece of movie content, so the content searching unit 130 searches for other pieces of movie content which have received high scores with respect to 'touching' and 'performance' among entire pieces of movie content.

In this manner, the present invention is able to search for personalized content based on a user's preference using a user comment-based search technique, thereby enhancing user's satisfaction with search results and enhancing search accuracy.

Meanwhile, in another general aspect of the present invention, an apparatus for searching for personalized content based on a user's comment 100 may further include a comment information database (DB) 140. The comment information DB 140 stores information about a user's comment on each piece of content.

Specifically, an apparatus for searching for personalized content based on a user's comment 100 may divide the user's comment into terms based on a morphological analysis and then store in the comment information DB 140 the information about the user's comment on each piece of content. For example, the comments stored in the comment information DB 140 may include content identity information, comment terms, comment scores, user identity information and comment time.

The comment information DB 140 for storing the information about the user's comment on each piece of content may be referred when the preference analyzing unit 110 analyzes a user's comment related to a user query and extracts the user's preferred terms.

Meanwhile, in another general aspect of the present invention, the apparatus for searching for personalized content based on a user's comment 100 may further include a content indexer 150. The content indexer 150 analyzes the user's comment on each piece of content, indexes terms related each piece of content and stores the indexed terms.

For example, the content indexer 150 may divide a user's comment on each piece of content into terms, calculate a score of each term in accordance with its frequency, index a specific number of high-frequency terms related to each piece of content and store in a content index Database (DB) 160 the specific number of indexed high-frequency terms.

Specifically, when the content indexer 150 stores in the content index DB 160 content index information, that is, the specific number of indexed terms, it may index the terms using various information such as frequency of terms included the user's comment and a user's scores on each piece of content.

Next, the content searching unit 130 may search for pieces of content corresponding to a query set from the content index DB 160 which stores indexed terms related to each piece of content.

Meanwhile, in one general aspect of the present invention, the apparatus for searching for personalized content based on a user's comment 100 may further include a search result providing unit 170. The search result providing unit 170 provides content information found by the content searching unit 130 to a user terminal, such as a PC and a smart phone, through which the user query is received.

At this time, the search result providing unit 170 may determine priorities of the found pieces of content and provide information about the found pieces of content according to the determined priorities. For example, the priorities may be scores calculated when the user's comments are analyzed. That is, in this exemplary embodiment, if a plurality of pieces of content are found, it is determined to provide the found plurality of pieces of content according to the priorities.

Meanwhile, in another general aspect of the present invention, the user comment-based personalized content searching unit 100 may further include a query receiving unit 180. The query receiving unit 180 receives a user query. For example, the query receiving unit 180 may provide a user interface for receiving a user query from a user terminal and receive the user query via the user interface.

When the user query is received through the query receiving unit 180, the preference analyzing unit 110 analyzes a corresponding user's comment related to the user query and extracts the user's preferred terms, and the query extending unit 120 selects at least one term from the terms extracted by the preference analyzing unit 110 and generates the query set which includes the user query and the selected term.

Next, the content searching unit 130 searches for pieces of contents based on a query set which includes the user query and the selected term. The search result providing unit 170 provides information about the found pieces of content to a user terminal.

In this manner, the present invention is able to search for personalized content based on a user's preference using a user comment-based search technique and provide the piece of personalized content to a user, thereby raising user's satisfaction with search results and enhancing search accuracy.

Figure 2:
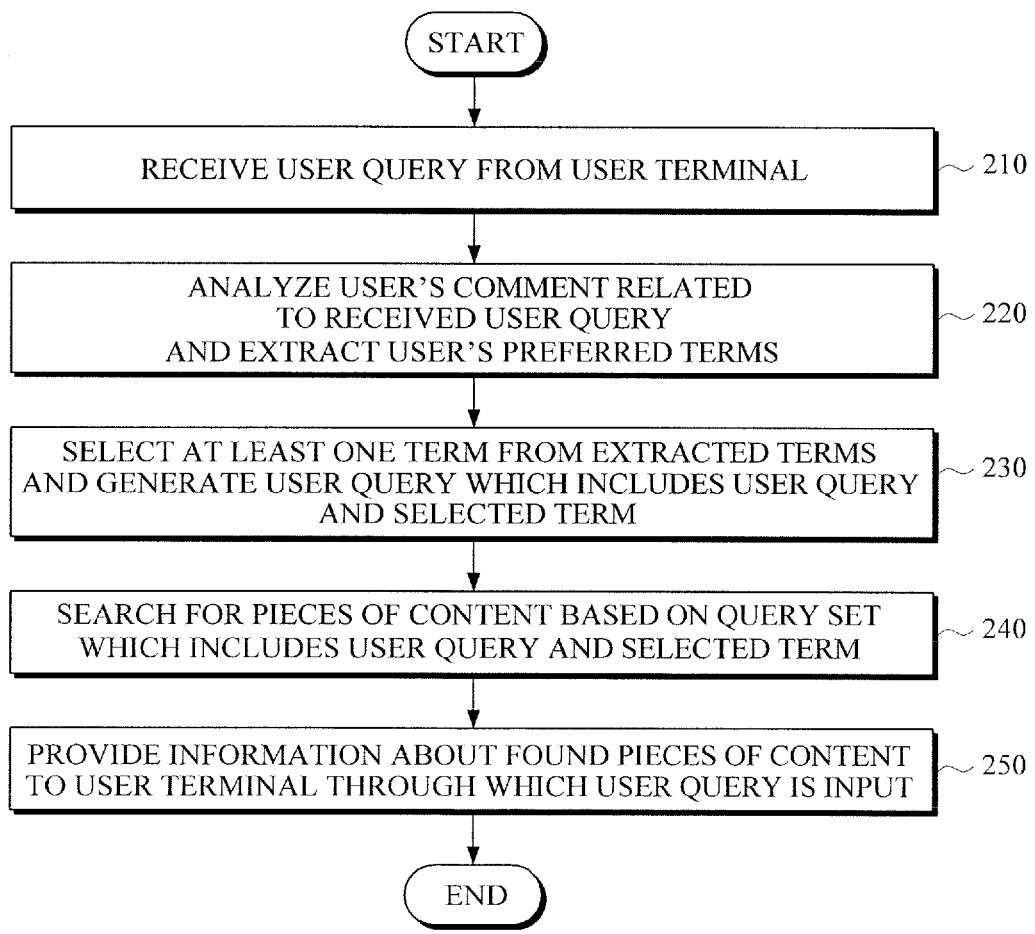
FIG. 2 is a flow chart illustrating a method for searching for personalized content based on a user's comment according to an exemplary embodiment of the present invention.

FIG. 2 shows a search process of the apparatus for searching for personalized content based on a user's comment shown in FIG. 1. FIG. 2 is a flow chart illustrating a method for searching for personalized content based on user comment according to an exemplary embodiment of the present invention.

Referring to FIG. 2, the user comment-based personalized content searching unit receives a user query from a user terminal in a query receiving operation 210. As the method for receiving the user query has been already described in the above, it is not provided herein.

Next, in a preference analyzing operation 220, the user comment-based personalized content searching unit analyzes corresponding user's comment related to the user query received in the query receiving operation 210 and extracts a user's preferred terms.

In the preference analyzing operation 220, a TF-IDF technique may be used to extract the user's preferred terms related to the user query from the information about the user's comment. As the method for extracting the user's preferred terms has been already described in the above, it is not provided herein.

Next, in a query extending operation 230, the user comment-based personalized content searching unit selects at least one term from the terms extracted in the preference analyzing operation 220, and generates a query set which includes the user query and the selected term. In the query extending operation 230, at least one term may be selected from the terms extracted in preference analyzing operation 220 based on a weight value assigned on each term.

Next, in a content searching operation 240, the user comment-based personalized content searching unit searches for pieces of content corresponding to the query set.

In the content searching operation 240, the pieces of content corresponding to the query set may be searched in a content index DB which stores indexed terms related to each piece of content. As the method for searching for pieces of content based on the query set has been already described in the above, it is not provided herein.

Next, in a search result providing operation 250, the user comment-based personalized content searching unit provides information about the pieces of content found in the content searching operation 240 to the user terminal through which the user query is received.

In the search result providing operation 250, priorities of the found pieces of content may be determined and information about the found pieces of content may be provided according to the determined priorities. As the method for providing the found pieces of content has been already provided in the above, it is not provided herein.

In this manner, the present invention is able to search for personalized content based on a user's preference using a user comment-based search technique and provide the piece of personalized content to a user, thereby raising the user's satisfaction with search results and enhancing search accuracy. In this manner, the above-mentioned objective of the present invention may be achieved.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for searching for personalized content based on a user's comment, the apparatus comprising:
    a computer system comprising a processor and a memory;
    a query receiving unit operating on the computer system and adapted to receive a user query from the user, the user query including one or more terms;
    a preference analyzing unit operating on the computer system and adapted to analyze the user's comment, wherein the user query and the user's comment are made by the same user and the user's comment is related to the user query, and the preference analyzing unit adapted to extract the user's preferred terms, and wherein the user's comment is the user's assessment of each piece of content;
    a query extending unit operating on the computer system and adapted to select at least one term from the extracted terms and to extend the user query by generating a query set which includes both the user query and the selected term, the query set including a plurality of terms used to request content from a database, the plurality of terms including both the one or more terms included in the user query and the selected term; and
    a content searching unit operating on the computer system and adapted to search for pieces of content based on the query set.

2. The apparatus of claim 1, wherein the preference analyzing unit extracts the user's preferred terms related to the user query from information about the user's comment using a Term Frequency-Inverse Document Frequency (TF-IDF) technique.

3. The apparatus of claim 2, wherein the query extending unit selects at least one term from the terms extracted by the preference analyzing unit based on a weight value assigned on each term.

4. The apparatus of claim 2, further comprising: a comment information database (DB) configured to store the information about the user's comment on each piece of content.

5. The apparatus of claim 1, wherein the content searching unit is adapted to search for pieces of content corresponding to a query set from a content index database (DB) which stores indexed terms related to each piece of content.

6. The apparatus of claim 5, further comprising: a content indexer configured to analyze the user's comment on each piece of content, index the terms related to each piece of content and store the indexed terms.

7. The apparatus of claim 1, further comprising: a search result providing unit operating on the computer system and adapted to provide information about the pieces of content found by the content searching unit to a user terminal through which the user query is received.

8. The apparatus of claim 7, wherein the search result providing unit determines priorities of the found pieces of content and provides the information about the found pieces of content according to the determined priorities.

9. The apparatus of claim 1, wherein the query receiving unit provides a user interface and receives the user query from the user terminal through the user interface.

10. A method for searching within a computer system comprising a processor and a memory for personalized content based on a user's comment, the method comprising:
   receiving a user query from a user terminal, the user query Including one or more terms;
   analyzing the user's comment on the received user query and extracting the user's preferred terms, wherein the user query and the user's comment are made by the same user, and the user's comment is the user's assessment of each piece of content;
   selecting at least one term from the extracted terms and extending the user query by generating a query set which includes both the user query and the selected term, the query set including a plurality of terms used to request content from a database, the plurality of terms including both the one or more terms included in the user query and the selected term;
   searching within the computer system for pieces of content based on a query set; and
   providing information about the found pieces of content to the user.

11. The method of claim 10, wherein the extracting of the user's preferred terms comprises extracting the user's preferred terms related to the user query from the information about the user's comment using a TF-IDF technique.

12. The method of claim 11, wherein the selecting of the at least one term comprises selecting at least one term from the extracted terms based on a weight value assigned on each term.

13. The method of claim 10, wherein the searching for pieces of content comprises searching for the pieces of content corresponding to the query set from a content index database (DB) which stores indexed terms related to each piece of content.

14. The method of claim 10, wherein the providing of the search results comprises determining priorities of the found pieces of content and providing information about the found pieces of content according to the determined priorities.

15. An apparatus for searching for personalized content based on a user's comments about content within a database, the apparatus comprising:
   a computer system comprising a processor and a memory;
   a query receiving unit operating on the computer system and adapted receive a user query from the user, the user query including one or more terms;
   a preference analyzing unit operating on the computer system and adapted to analyze the user's comment, wherein the user query and the user's comment are made by the Same user and the user's comment is related to the user query, and the preference analyzing unit adapted unit adapted to extract the user's preferred terms, and wherein the user's comment is the user's assessment of each piece of content;
   wherein the preference analyzing unit extracts the users preferred terms based on the frequency of the terms included in the user's comment other information including the user's score on a corresponding piece of content;
   a query extending unit operating on the computer system and adapted to select at least one term from the extracted terms and to extend the user generating a query set which includes both the user query and the selected term, the query set including a plurality of terms used to request content from a database, the plurality of terms including both the one or more terms included in the user query and the selected term; and
   a content searching unit operating on the computer system and adapted to search for pieces of content based on the query set, and
   wherein the extracting of the users preferred terms comprises extracting the user's preferred terms using a TF-IDF technique.

16. The apparatus of claim 15 wherein the selecting of the at least one term comprises selecting at least one term from the extracted terms based on a weight value.

17. The apparatus of claim 15 further comprising a search result providing unit that provides information about the pieces of content found by the content searching unit to a user terminal through which the user query is received.

* * * * *